United States Patent
Martin et al.

[11] Patent Number: 5,868,338
[45] Date of Patent: Feb. 9, 1999

[54] SINGLE REEL CARTRIDGE WITH IMPROVED HOUSING ASSEMBLY

[75] Inventors: Robert C. Martin, Stillwater; G. Phillip Rambosek, Shafer, both of Minn.; William J. Vanderheyden, Wahpeton, N. Dak.; John W. Louks, North Hudson, Wis.; Donald L. Pochardt, Denmark; Satinder K. Nayar, Woodbury, both of Minn.

[73] Assignee: Imation Corp., Oakdale, Minn.

[21] Appl. No.: 73,327

[22] Filed: Jun. 8, 1993

[51] Int. Cl.⁶ .......................... G11B 23/087; G11B 23/02
[52] U.S. Cl. .............................. 242/348; 360/132
[58] Field of Search ................ 242/348, 348.2, 242/347, 347.2; 220/4.21, 353, 359, 612, 678; 352/78 R; 354/275; 360/132

[56] References Cited

U.S. PATENT DOCUMENTS

| | | | |
|---|---|---|---|
| 3,951,264 | 4/1976 | Heidecker et al. | 206/308.3 |
| 4,566,653 | 1/1986 | Bettinger et al. | 242/347.2 |
| 4,894,673 | 1/1990 | Beach | 242/348 X |
| 5,115,268 | 5/1992 | Kitagawa et al. | 242/348 X |
| 5,199,593 | 4/1993 | Kita | 220/359 |

FOREIGN PATENT DOCUMENTS

| | | |
|---|---|---|
| 0214005 | 3/1987 | European Pat. Off. . |
| 0 610 776 A1 | 8/1994 | European Pat. Off. . |
| DE 28 06 467 | 8/1978 | Germany . |
| G 92 11 029 | 2/1993 | Germany . |
| 920042 | 3/1993 | Germany ............................. 242/347 |
| G 92 11 031 | 3/1993 | Germany . |
| G 92 22 030 | 3/1993 | Germany . |

OTHER PUBLICATIONS

Plastics Engineering, "When The 'Vibes' Are Right For Vibration Welding", Aug. 1980, pp. 20–23.

International Search Report.

*Primary Examiner*—John Q. Nguyen
*Attorney, Agent, or Firm*—Eric D. Levinson

[57] ABSTRACT

A single reel data tape cartridge housing includes a base and a cover. The base includes four outer side walls which are formed with at least one step such that the outer walls step to a decreased thickness toward their free end. The cover includes four outer side walls which are formed with at least one step such that the outer walls step to a decreased thickness toward their free end. The base and cover also include four inner walls which are formed with two steps such that the inner walls step to a decreased thickness toward their free end. The inner and outer walls of the cover complementarily mate with the inner and outer walls of the base. A projection can be placed within pockets in the base and cover to locate the base and cover during assembly.

10 Claims, 5 Drawing Sheets

SINGLE REEL CARTRIDGE WITH IMPROVED HOUSING ASSEMBLY

TECHNICAL FIELD

The present invention relates to tape cartridges. More particularly, the present invention relates to single reel tape cartridge housing assemblies.

BACKGROUND OF THE INVENTION

Single reel data tape cartridges, one generation of which is known as 3480 type cartridges, include a reel containing magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the take-up reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes through a vacuum guide, a magnetic transducer head, and a tension transducer.

The tape cartridge is formed of a molded base and cover which are ultrasonically welded to each other to form the housing for the cartridge. A small weld bead is molded into the bottom surface of the walls of the cover. This weld bead mates with the top surface of the walls of the base. The sonic energy is generally applied through the cover and to the weld bead to melt the bead onto a land on the base and cover. It is also known to locate the weld bead on the base.

Proper assembly requires proper registration of the base and cover and proper collapse of the weld bead during welding. However, improper registration can yield poor control of the outer dimensions of the cartridge and increase external and internal flash due to reduced clearances. In extreme cases this can prevent the weld bead from contacting the mating wall surface of the base. This can result in poor weld strength and cartridge failure if the cartridge is stressed such as by being dropped. In less extreme cases, it can result in an increase in exposed flash and reduced strength. Nonuniform weld bead collapse also can result in poor weld strength and cartridge failure if the cartridge is stressed. Proper collapse depends on proper positioning and support of the base and cover during welding, and on proper balance of the input ultrasonic intensity. Also, welding of the housing assembly can result in weld flash escaping from the interface between the base and the cover if the joint width and flash area are insufficient to contain the flash created when welding to the designed weld depth. Raised walls are designed into the inner walls of the base or the cover to minimize weld flash escaping into the inside of the cartridge where it can affect the tape and cause errors. Flash on the outside of the housing is cosmetically objectionable.

The base of these known cartridges includes raised wall sections which serve as locators to help align and locate the cover with respect to the base during assembly. These locators operate in only one direction and are essentially ineffective as flash retainers.

There is a need to provide a cartridge base and cover assembly which reduces the amount of weld flash that is generated during welding while maintaining sufficient weld strength to resist the propagation of cracks when the cartridge is stressed. There is a need for a single reel cartridge assembly which prevents flash escaping from the interface between the base and the cover either into the cartridge or outside of the cartridge. There is also a need for a system to improve the assembly of the housing by facilitating alignment of the cover and the base.

SUMMARY OF THE INVENTION

A single reel data tape cartridge according to the present invention includes a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered. The tape reel includes a cylindrical hub having a cylindrical tape winding surface, an upper flange mounted on one axial end of the hub, and a lower flange mounted on the other axial end of the hub.

The cartridge is formed of a base and a cover which combine to form a housing. The base includes a major wall and four outer side walls mounted along the edge of the major wall. The outer walls of the base are formed with a single or double step such that the outer walls step to a decreased thickness toward their free end. The outer walls are divided into a thinner free end portion and a thicker main wall portion. The cover is mounted on the base and includes a major wall and four outer side walls mounted along the edge of the major wall. The outer walls of the cover are formed with a single or double step such that the outer walls step to a decreased thickness toward their free end. The outer walls are divided into a thinner free end portion and a thicker main wall portion. The free end portion of the outer walls of the cover receives the free end portion of the outer walls of the base when the base and cover are assembled to form the cartridge housing.

The base also includes four inner walls which are located in respective corners of the base. The inner walls form a tape cavity and include a lower left corner wall, a lower right corner wall, an upper left corner wall, and an upper right corner wall. The inner walls of the base are formed with two steps such that the inner walls step to a decreased thickness toward their free end and the inner walls are divided into a main portion, a central portion, and an end portion. The cover also includes four inner walls which are located in respective corners of the cover. The inner walls of the cover combine with the inner walls of the base to form the tape cavity and include a lower left corner wall, a lower right corner wall, an upper right corner wall, and an upper left corner wall. The inner walls of the cover are formed with at least one step such that the inner walls step to a decreased thickness toward their free end and the inner walls are divided into a main portion, a central portion, and an end portion. The end portion of the inner walls of the cover receives the central portion of the inner walls of the base and the central portion of the inner walls of the cover receives the end portions of the inner walls of the base when the base and cover are assembled to form the cartridge housing.

The free end and central portions of both the base and the cover serve as a flash guard. The free end and central portions of the base inner walls have a complementary shape to that of the central and free end portions of the cover outer walls, and the free end portion of the base outer walls have a complementary shape to that of the free end portion of the cover outer walls. When the housing is assembled, the wall configurations provide a tortuous path for the flash to travel to prevent flash from marring the appearance of the cartridge or the function of the tape reel.

The central portion of the inner walls of the base extends around most of the perimeter of the tape cavity to insure that weld flash does not enter the tape cavity. Also, on the portions of the base inner walls which are located closest to the tape pack in the tape cavity, the free end portion could extend beyond the central portion by a height that is generally at least 50% greater than the height of the central portion.

In one embodiment the cartridge housing also includes at least one projection located adjacent the side walls of the cover and a corresponding number of pockets located adjacent the side walls of the base. The projections mate with and are received in the pockets during assembly of the housing to act as internal locators. The pockets include four side walls, one of which is one side wall of the base. An energy concentrator is formed on the end of the projection to provide a weld site within the pocket which is outside of the plane of the parting line between the base and the cover.

Alternatively, the pockets are located adjacent the side walls of corresponding locations of the base and the cover and the projection is a separate element which is mounted within the pockets of the base and cover and to bridge the parting line between the base and the cover.

DETAILED DESCRIPTION OF PREFERRED EMBODIMENTS

Figure 1:
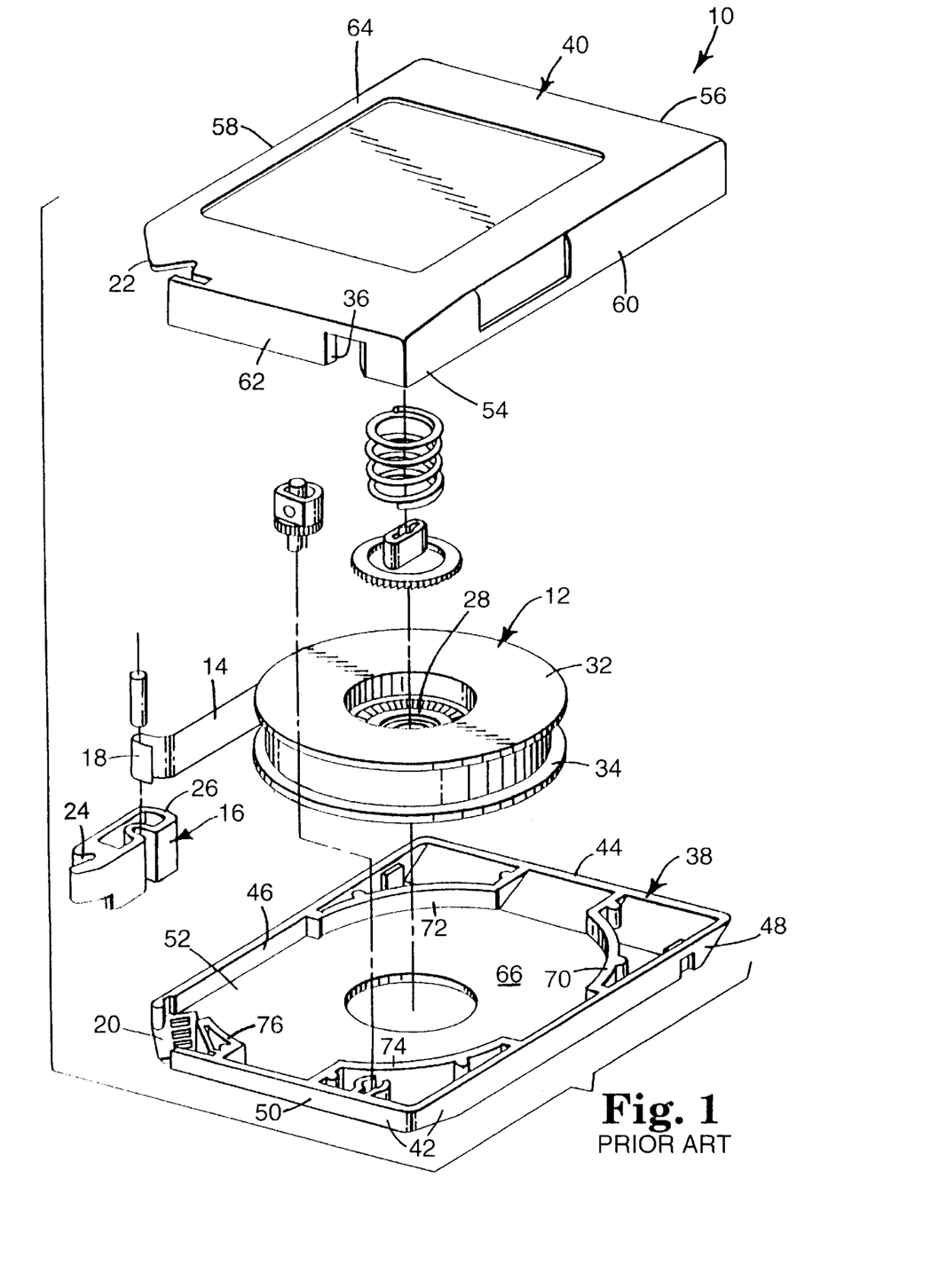
FIG. 1 is an exploded perspective view of the known features of a single reel tape cartridge of the present invention.

A single reel data tape cartridge 10, such as a 3480 type tape cartridge shown in FIG. 1, includes a tape reel 12 containing magnetic tape 14 with a leader block 16 attached to the free end 18 of the tape 14 as it extends from the reel 12. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus and engages an inclined surface of the corner of the cartridge. The rear surface is rounded 26 to form a portion of an arc of a radius to match the periphery of the take-up reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel. The tape reel 12 includes a cylindrical hub 28 having a cylindrical tape winding surface (not shown), an upper flange 32 mounted on one axial end of the hub, and a lower flange 34 mounted on the other axial end of the hub.

The tape drive apparatus includes a mechanism which interacts with the tape cartridge 10 to sense whether the tape 14 can be erased and recorded over or whether the tape is write-protected. The front wall of the cartridge has a record opening 36 which interacts with the cartridge drive system. An erasure preventing device is located in the record opening 36. When the erasure preventing device blocks the record opening 36, the tape 14 can be erased. When the erasure preventing device unblocks the record opening 36, the tape drive apparatus mechanism disables the recording function to prevent accidental erasure and the tape 14 cannot be erased.

The cartridge 10 is formed of a base 38 and a cover 40 which combine to form a housing. The base 38 includes four outer walls 42: a rear wall 44, two opposing side walls 46, 48, and a front wall 50. A major wall 52 connects the rear, front, and side walls. The cover 40 also includes four outer walls 54: a rear wall 56, two opposing side walls 58, 60, and a front wall 62. A major wall 64 connects the rear, front, and side walls.

The base 38 and cover 40 also include four inner walls which are located in respective corners of the base 38 and the cover 40 and which form the tape cavity 66. The base 38 inner walls 68 include a lower left corner wall 70, a lower right corner wall 72, an upper left corner wall 74, and an upper right corner wall 76 which serves as a leader block corner wall. In alternative configurations, the upper left corner wall 74 can serve as the leader block corner wall. The cover 40 inner walls 78 include a lower left corner wall, a lower right corner wall, an upper right corner wall, and an upper left corner wall, which can serve as the leader block corner wall. The directions left and right are based on the leader block area being in the right of the cartridge.

The details of the present invention will be described with reference to FIGS. 2–8. The present invention uses a wall construction with an internal step in the interface between the base 38 and the cover 40.

Figure 6:
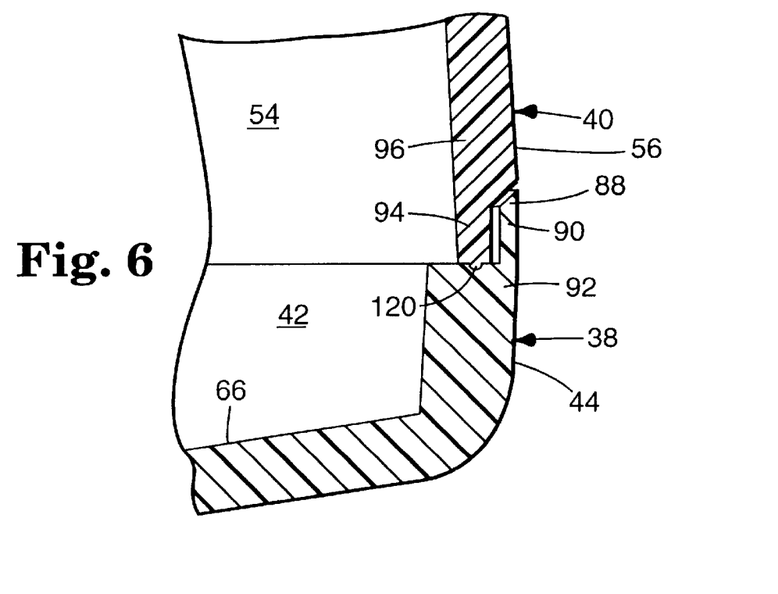
FIG. 6 is a cross-sectional view of the side walls of the tape cartridge taken along line 6—6 of FIG. 3.

The outer walls 42 of the base 38 and the outer walls 54 of the cover 40 are both formed with a step such that the outer walls 42, 54 step to a decreased thickness toward the free end 88 of the outer walls 42, 54, as shown in FIG. 6. This step divides the outer walls 42, 54. The base outer walls 42 are divided into a thinner free end portion 90 and a thicker main wall portion 92. The cover outer walls 54 are divided into a thinner free end portion 94 and a thicker main portion 96. The thinner free end portions 90 of the base 38 serves as a flash guard. The free end portion 90 of the base 38 outer walls 42 is received in the complementarily-shaped free end portion 94 of the cover 40 outer walls 54.

Figure 7:
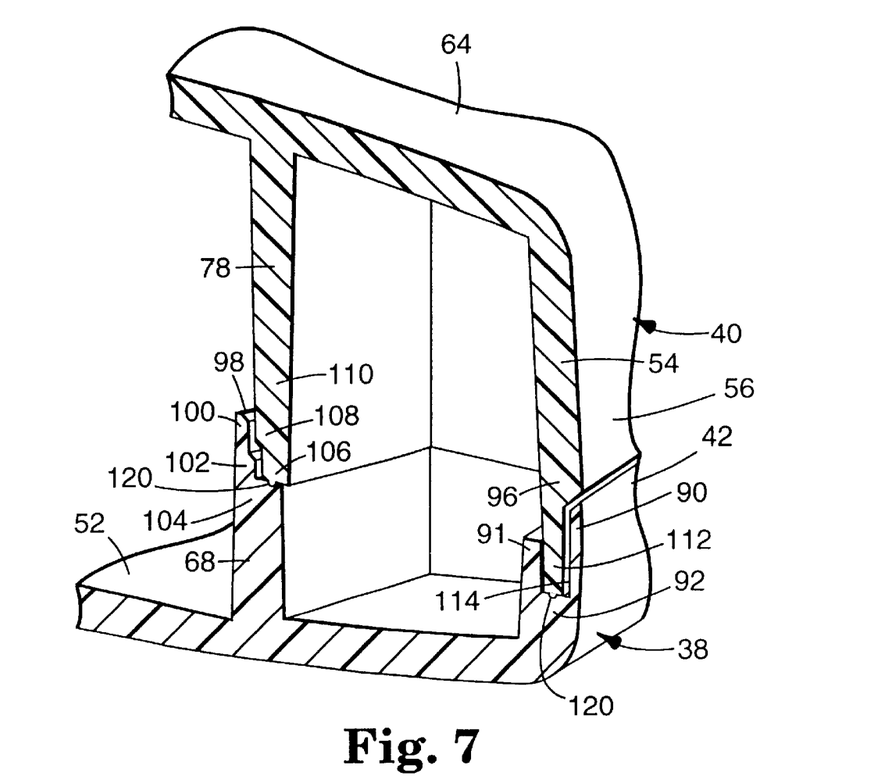
FIG. 7 is a cross-sectional view of the side walls of the tape cartridge of FIG. 2.

Referring to FIG. 7, the inner walls 68 of the base 38 and the inner walls 78 of the cover 40 which form the tape cavity 66 are formed with steps such that the inner walls 68, 78 step to a decreased thickness toward their free end 98. Two steps are formed on the outer surface of the base inner wall 68 and at least one step is formed on the inner surface of the cover inner wall 78. These steps divide the inner wall 68 into a main portion, a central portion, and an end portion and divide the inner wall 78 into a main portion and an end portion. The base inner walls 68 are divided into a thin free end portion 100, a thicker central portion 102, and a thicker main portion 104. The cover inner walls 78 are divided into a thin free end portion 106, a thicker central portion 108, and a main portion 110 that is not stepped in thickness from the central portion 108. In an alternative embodiment, the cover inner walls 78 can have two steps with the main portion 110 being thicker than the central portion 108. In this embodiment, the inner walls 68, 78 of the base 38 and cover 40 are complementarily-shaped. In both of these embodiments, the central and end portions 102, 100 of the base inner walls 68 are received in the respective end and central portions 106, 108 of the cover inner walls 78. Thus, the walls of the base and the cover are complementary to each other and weld together, preferably with a clearance between the end portion 100 of the base inner walls 68 and the central portion 108 of the cover inner walls 78.

Weld beads 120 on the inner walls of the cover can be reduced from the 0.036 cm by 0.071 cm (0.014 in by 0.028 in) size found in known cartridges. The size of the weld beads is reduced to 0.025 cm by 0.041 cm (0.010 in by 0.016 in). Additionally, the weld beads 120 on the outer walls can be reduced to 0.036 cm by 0.050 cm (0.014 in by 0.020 in). This reduces the amount of weld flash generated during welding while maintaining sufficient strength to resist crack propagation if the cartridge is stressed. Thus, smaller weld beads 120 can be used on the inner walls than on the outer walls. Energy concentrators other than weld beads, such as shear joints, also can be used, although the illustrated embodiments all use weld beads. Regardless of the type of energy concentrator, the location of concentration is referred to as a weld site.

Figure 2:
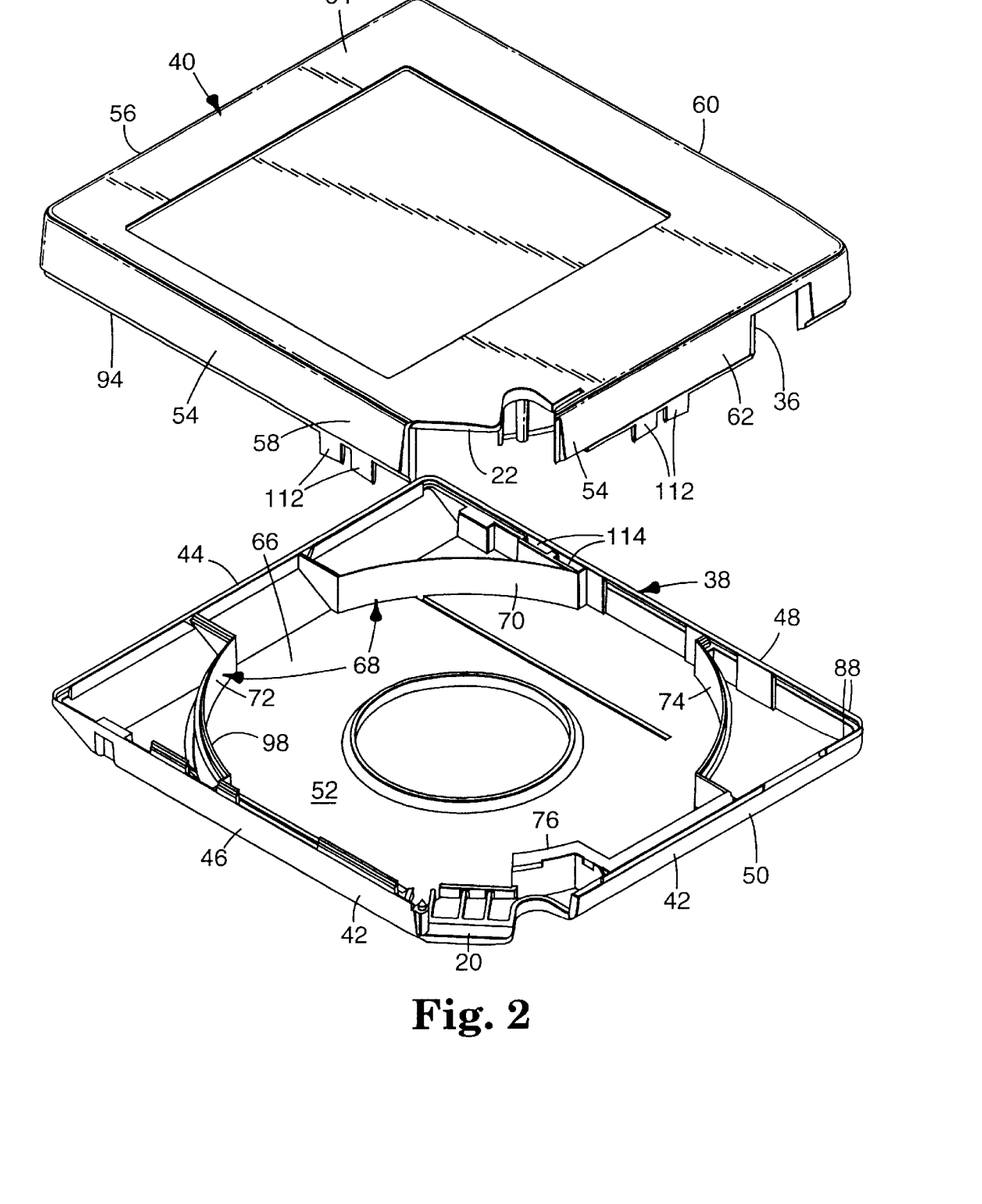
FIG. 2 is an exploded perspective view of a single reel tape cartridge showing the features of the present invention.
Figure 3:
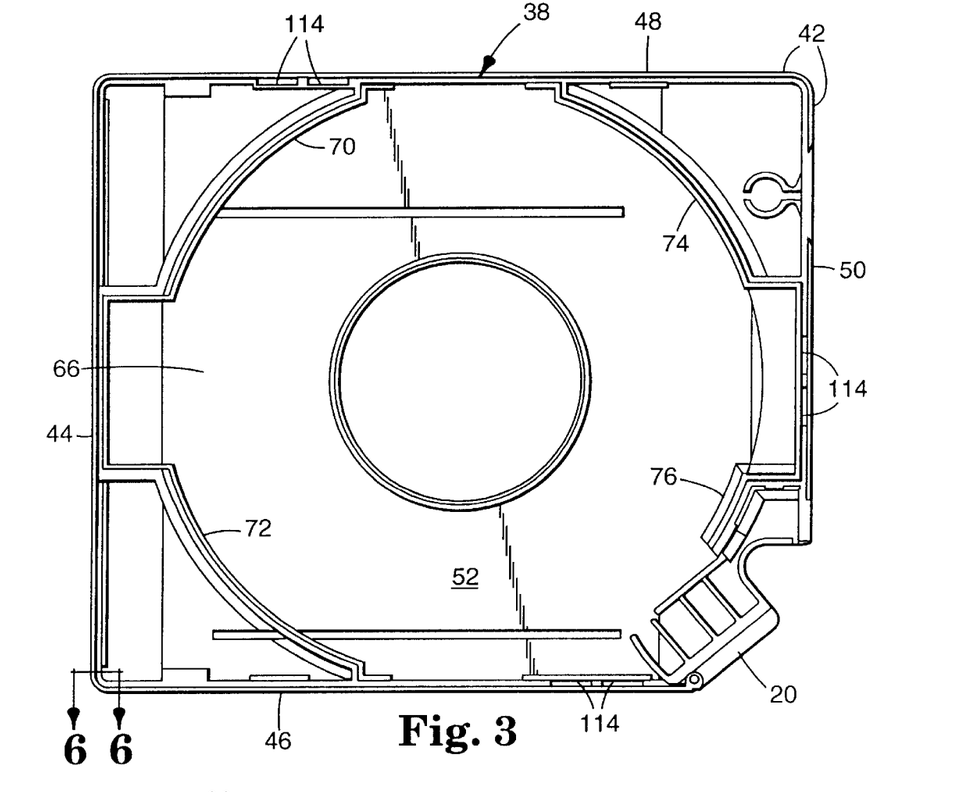
FIG. 3 is a top view of the tape cartridge base of FIG. 2.
Figure 4:
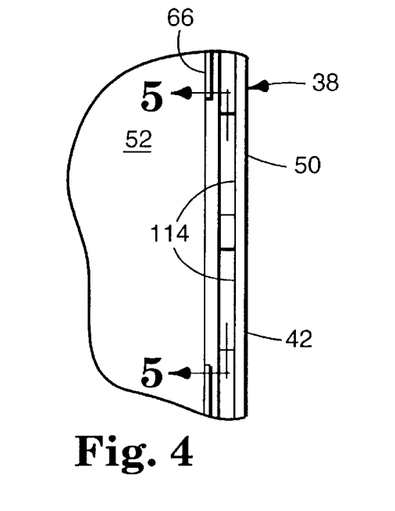
FIG. 4 is an enlarged top view of a portion of the tape cartridge base of FIG. 2.

As shown in FIG. 2, the free end portion 100 and the central portion 102 of the inner walls 68 of the base 38 extends around most of the perimeter of the tape cavity 66 to insure that weld flash does not enter the tape cavity 66. In the curved portions of the inner walls 68, which are located closest to the tape pack in the tape cavity 66, the free end portion 100 of the inner walls 68 of the base 38 extends beyond the central portion 102 by a large height. This height is approximately twice the height of the central portion 102 to reduce the possibility of tape flash entering the tape cavity. This is a major departure from known cassettes which, while using a wall analogous to the central portion as a flash guard, do not have a high free end portion, do not provide a tortuous path, and therefore do not block flash as well as this invention.

These inner and outer wall configurations provide a tortuous path for the flash to travel to prevent flash from marring the appearance of the cartridge 10 or the function of the tape reel 12. The weld guards incorporate multiple bend paths at the inner walls 68, 78 to prevent flash from migrating into the tape pack cavity 66 in the cartridge 10. The weld guards incorporate at least one bend path at the outer walls 42, 54 to prevent flash from migrating to the outer surface of the housing where it could become visible. Because a smaller weld bead and additional flash guards are used the ability to completely weld the contacting surfaces without flash is improved and more of the contacting surfaces can be welded with increased strength. This permits better control of the overall height of the cartridge because the interface between the base 38 and the cover 40 is precisely controlled. This design and assembly technique permits the tight dimensional tolerances to be achieved as it is more precise than the known welding techniques.

In the embodiment best shown in FIGS. 3–5 and 7, the outer wall 42 of the base 38 is formed with an inner portion 91 of the free end portion 90. The inner portion 91 combines with the outer portion of the free end portion 90 to create a pocket 114. The cover outer walls 54 include a thinner projection 112 at the end of the thicker main portion 96. The projection 112 is received within the pocket 114 between the outer portion of the free end portion 90 and the inner portion 91. This provides a bending tortuous path in the direction toward the inside of the cartridge 10 as well as in the direction toward the outside. Additionally, a projection-pocket configuration could be located adjacent the inner walls 68, 78 of the base 38 and cover 40. Alternatively, the projections 112 can be formed on the base 38 and the pockets 114 formed on the cover 40. Also, the base 38 can have both projections 112 and pockets 114 which mate with pockets 114 and projections 112 in the cover 40.

Figure 5:
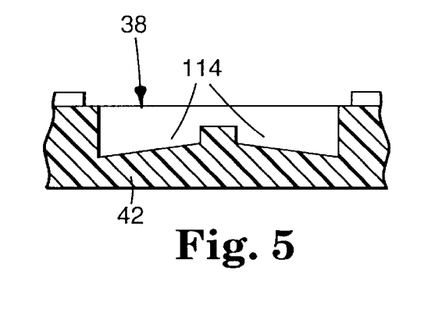
FIG. 5 is a cross-sectional view of the tape cartridge base taken along line 5—5 of FIG. 4.

The projection can be opposing angled projections 112, with angled end walls, as best shown in FIG. 2. These projections 112 mate with and are received in pockets 114 molded in the base 38 during assembly. The pockets 114 have angled end walls which are complementary to the angled end walls of the projections 112, as shown in FIG. 5. The angles allow bidirectional alignment to help bring the base 38 and cover 40 together in alignment during assembly and act as internal locators during the assembly of the base 38 to the cover 40 and eliminate the need for external adjustment during welding. As the angle of the projections 112 increases, greater alignability is achieved. Also, it is preferred that a maximum of one projection-pocket pair be placed on each of the four sides of the cartridge to prevent adjacent projections 112 from competing with each other.

The projection-pocket pairs locate the base 38 and cover 40 over a larger range than in known cartridges. The enclosed pockets 114 enable the projections 112 and pockets 114 to locate the base 38 and cover 40 in two directions, as contrasted with known locators which are not received in pockets and therefore locate in only one direction. Moreover, the pockets 114 are formed with thin walls, reducing and practically eliminating sink problems. The known locators are thick areas which create sink.

After the projections 112 and pockets 114 locate the base 38 and cover 40, the projections 112 provide additional weld sites outside of the plane of the existing parting line weld bead. The end wall of the projections 112 can be formed with weld beads or other energy concentrators to permit welding. Alternatively, the weld beads can be formed on the end walls of the pockets 114 or on both the projections and pockets. These additional weld sites are located deep within the pockets 114 and can be welded with high penetration without risking the resulting weld flash migrating to the parting line between the base 38 and the cover 40. These weld locations provide a long distance for flash to travel to the parting line between the base 38 and the cover 40. This creates a wider process window. This locating system helps improve part registration, improve drop strength, reduce exposed weld flash, and improve weld strength by bridging the normal parting plane of the parts.

Figure 8:
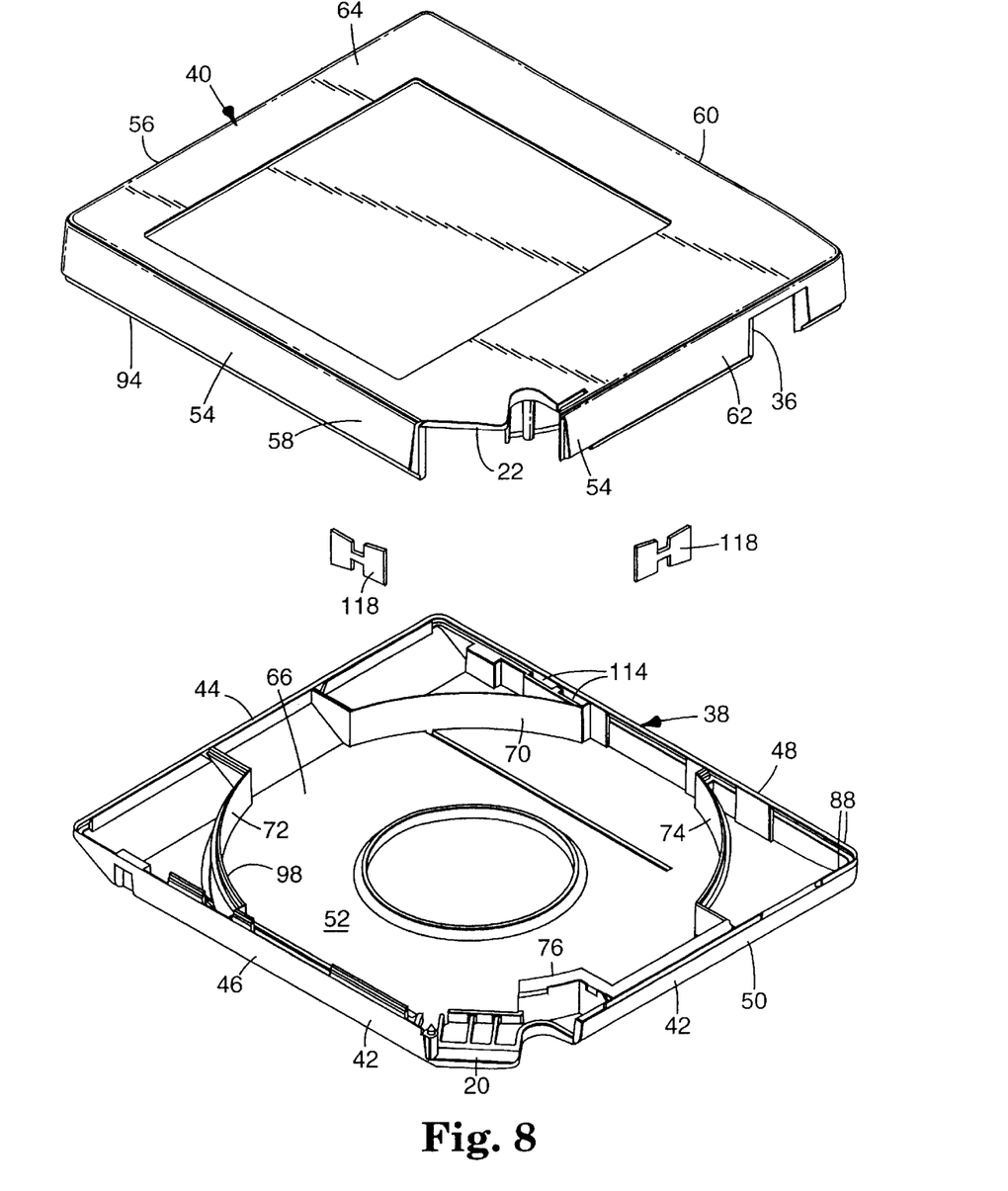
FIG. 8 is an exploded perspective view of the tape cartridge according to another embodiment of the present invention.

In another embodiment, shown in FIG. 8, pockets 114 can be molded in both the base 38 and the cover 40. Separately-formed projections, shown as projection inserts 118, with opposing angled end walls on both ends can be inserted into both pockets 114 to help align and secure together the base 38 and cover 40. The projection inserts 118 are inserted into the base 38 during assembly and then locate the base 38 with respect to the cover 40. In this configuration, the projections 118 provide additional weld sites out of the plane of the existing weld bead in both the base 38 and in the cover 40. Additionally, in this embodiment, bases 38 and covers 40 can be stored and conveyed using current assembly equipment without any elements extending beyond the parting line of the bases 38 or covers 40. The projection inserts 118, which project beyond the parting line, can be inserted later to perform locating and welding. Alternatively, a separate pocket insert can mate with projections formed on both the base and the cover.

The shape of the flash guards (formed by the free ends 88 of the outer walls and the free ends 98 of the inner walls) serve as a lead in to assist in the assembly of the cartridge 10 to permit the base 38 and the cover 40 to better and more easily mate. Alternatively, without these flash guards, the lead in function can be performed by locator tabs (not shown) formed on the base which are received within the cover outer walls 54 during assembly. These locator tabs can assist in aligning the projections 112 in the pockets 114 and serve as secondary aligning devices.

Various changes and modifications may be made in the invention. For example, the weld design and housing component shapes can be used with cartridge and cassette designs other than single reel tape cartridges. Additionally, the projection-pocket pairs, whether using integral projections or separate projection or pocket inserts, can be used in other environments. The projections, projection inserts, pockets, and pocket inserts can be used to help locate and mate any two mating parts, particularly when the parts should be precision mated.

We claim:

1. A tape cartridge insertable into a tape drive apparatus, comprising:

a tape reel; and a tape cartridge housing, comprising:

a base comprising a major wall and four outer side walls mounted along the edge of the major wall, wherein at least part of the outer side walls of the base comprise a thinner free end portion and a thicker main wall portion; and a cover which is mounted on and welded to the base comprising a major wall and four outer side walls mounted along the edge of the major wall, wherein at least part of the outer side walls of the cover comprise a thinner free end portion and a thicker main wall portion; wherein the free end portion of the outer walls of the cover receives the free end portion of the outer walls of the base when the base and cover are assembled to form the cartridge housing; wherein the free end portion of the base outer walls has a complementary shape to that of the free end portion of the cover outer walls; wherein the base is welded to the cover at an end surface of the free ends of the outer walls of the cover, wherein the free end portions of both the base and the cover outer walls serve as a flash guard; and wherein when the housing is assembled, the outer walls provide a tortuous path for the flash to travel to prevent flash from marring the appearance of the cartridge or the function of the tape reel.

2. The cartridge of claim 1 wherein:

the base further comprises four inner walls which are located in respective corners of the base, wherein the inner walls form a tape cavity and comprise a lower left corner wall, a lower right corner wall, an upper left corner wall, and an upper right corner wall, and wherein the inner walls comprise a main portion, a central portion, and an end portion; and the cover further comprises four inner walls which are located in respective corners of the cover, wherein the inner walls of the cover combine with the inner walls of the base to form the tape cavity and comprise a lower left corner wall, a lower right corner wall, an upper right corner wall, and an upper left corner wall, and wherein the inner walls of the cover comprise a main portion, a central portion, and an end portion, wherein the end portion of the inner walls of the cover receives the central portion of the inner walls of the base and the central portion of the inner walls of the cover receives the end portions of the inner walls of the base when the base and cover are assembled to form the cartridge housing; and wherein the free end portions of both the base and the cover serve as a flash guard, wherein when the housing is assembled, the inner walls provide a tortuous path for the flash to travel to prevent flash from marring the appearance of the cartridge or the function of the tape reel.

3. The cartridge of claim 2 wherein the central portion of the inner walls of the base extends around at least one third of the perimeter of the tape cavity to insure that weld flash does not enter the tape cavity, and wherein the inner walls of the base comprise curved portions which are located closest to the tape reel in the tape cavity.

4. The cartridge of claim 2 wherein the cover is mounted to the base using energy concentrators on the inner walls of the cover and on the outer walls of the cover.

5. The cartridge of claim 4 wherein the energy concentrators on the inner walls are smaller than the energy concentrators on the outer walls.

6. The cartridge of claim 1 wherein the free end portion of at least one outer wall of the base comprises an outer portion and wherein the same outer wall of the base further comprises an inner portion and two side portions which combine with the outer portion to form a pocket which receives and completely surrounds the free end portion of the outer wall of the cover, wherein the free end portion and the pocket align the base and cover during assembly.

7. The cartridge of claim 1 further comprising:

at least one projection having an end wall and located adjacent the side walls of the cover; and at least one pocket, having an end wall, inner and outer portions and two side walls, corresponding in number to the number of projections, and located adjacent the side walls of the base, wherein each projection mates with, is received in a respective pocket, and is completely surrounded by the pocket to act as internal locators during the assembly of the base to the cover, wherein the pockets comprise side walls, and wherein one of the side walls is one side wall of the base.

8. The cartridge of claim 7 further comprising an energy concentrator formed on at least one of the projection end wall and the pocket end wall to provide a weld site within the pocket which is outside of a plane of the molding parting line between the base and the cover.

9. The cartridge of claim 7 wherein each projection end wall is angled and each pocket end wall is angled, and wherein the angled projection end walls are complementary to the angled pocket end walls for mating engagement.

10. The cartridge of claim 1 further comprising:

at least one pocket located adjacent the side walls of corresponding locations of the base and the cover; and at least one projection, corresponding in number to the number of pockets, separate from both the base and the cover, adapted to be mounted within the corresponding pockets of the base and cover and to bridge the parting line between the base and the cover, wherein each projection mates with and is received in a respective pocket to act as internal locators during the assembly of the base to the cover.

* * * * *